Sept. 15, 1925.
J. L. WEATHERWAX
1,553,344
ELECTROPERCUSSIVE WELDING
Filed June 15, 1921
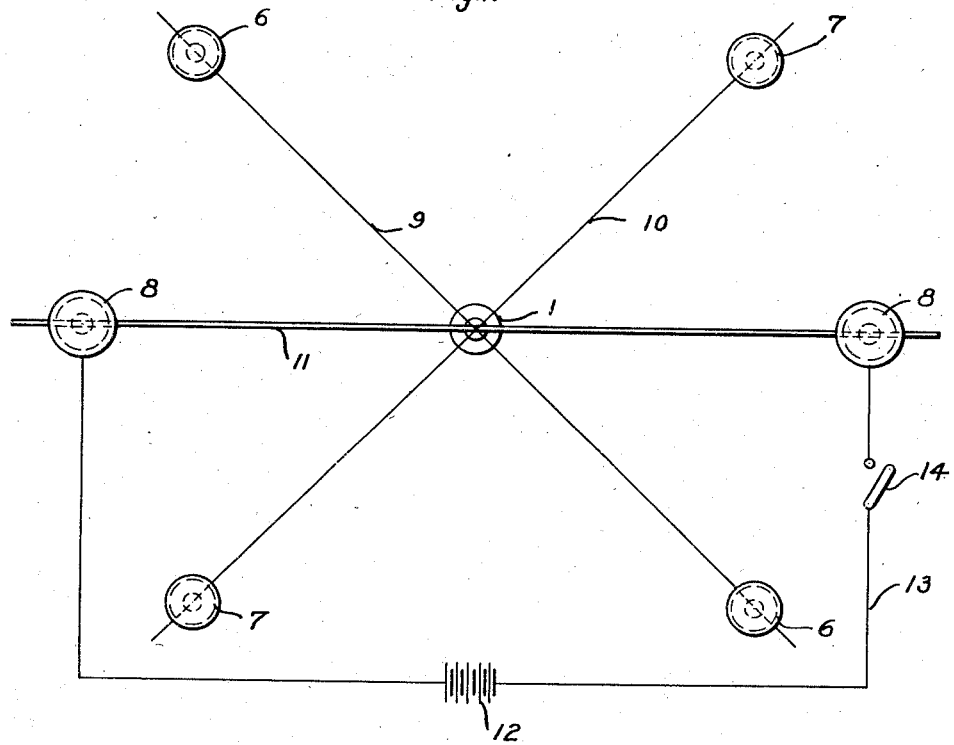
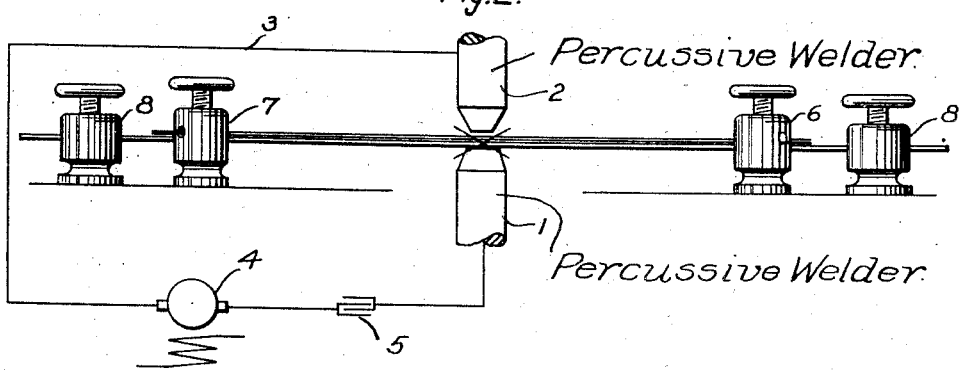
WITNESSES:
John Whiting
W. B. Jaspert.
INVENTOR
James L. Weatherwax.
BY
Wesley G. Carr
ATTORNEY Patented Sept. 15, 1925.

1,553,344

UNITED STATES PATENT OFFICE.

JAMES L. WEATHERWAX, OF EAST ORANGE, NEW JERSEY, ASSIGNOR TO WESTING-HOUSE LAMP COMPANY, A CORPORATION OF PENNSYLVANIA.

ELECTROPERCUSSIVE WELDING.

Application filed June 15, 1921. Serial No. 477,641.

*To all whom it may concern:*

Be it known that I, JAMES L. WEATHERWAX, a citizen of the United States, and a resident of East Orange, in the county of Essex and State of New Jersey, have invented a new and useful Improvement in Electropercussive Welding, of which the following is a specification.

My invention relates to electro-percussive welding, more especially to the welding of elongated metal bodies of different cross-sectional areas and of different melting points.

It is often desirable to join two or more elongated metal bodies of different cross-sectional areas by percussive welding but because of the relative sizes of the bodies it is difficult to obtain uniform heating thereof. Ordinarily, the smaller body tends to fuse and oxidize while the larger body does not attain a sufficiently high temperature. When such unequally heated bodies are brought into percussive engagement, the softer metal of the smaller body flows and forms about the less fused body, resulting in a brittle and imperfect weld.

Heretofore, it has been proposed to apply external means for heating the bodies to be welded which are of such size or have such characteristics that the welding current is insufficient to fuse the same. Preheating the bodies to be welded has also been proposed where the junction of such bodies occurred over a relatively large area, as in butt welding of large circular bodies and the like. The usual means for applying external heat has been blow-pipe flame which played across the junction of the bodies to be welded.

This method, however, was found to be impractical where the bodies to be welded were of relatively small cross section since the rapid oxidation, which takes place at temperatures exceeding 400° C., was instrumental in producing a brittle weld. This is particularly true in the spot or electro-percussive welding of thermo-couples, lamp filaments and similar delicate structures where the bodies to be joined are of varying cross sections and of different melting points.

My invention obviates the difficulties enumerated above, it being among the objects thereof to provide means for preheating one or more of the bodies to be joined prior to welding.

It is a further object of this invention to form a strong permanent joint of a plurality of relatively small bodies of varying cross sections that shall be free from excessive oxidation or extreme brittleness.

In practising my invention, I provide a pair of superposed electrodes connected to a source of welding current and a plurality of gripping members co-operating with each other and so placed as to clamp the ends of the bodies to be welded. Some of said gripping members may be connected to a source of electrical energy, so that the bodies to be welded may be preheated by passing a current therethrough.

The bodies to be welded are so held in position by the gripping members that their junction will be located between the two electrodes. The lower electrode functions as a support on which the bodies rest during the welding operation.

To join a plurality of metal bodies by welding, I clamp them in suitable relation to each other in the gripping members, as mentioned above, securing the bodies of high conductivity and those that are highly refractory in electrical heating circuits and preheating the same by passing a current therethrough.

The current may be regulated to obtain the required temperatures which should not exceed the point where excessive oxidation takes place. I then bring the upper electrode into percussive engagement with the bodies to be welded at the junction thereof and simultaneously pass a relatively large welding current therethrough to fuse the respective engaging surfaces of said bodies and forge them together to form a unitary structure.

In the accompanying drawings, forming a part hereof and in which like reference characters designate like parts, Figure 1 is a diagrammatic view of a welding system embodying my invention, and Fig. 2 is a partially diagrammatic and partially side elevational view of my welding system.

A pair of infusible electrodes 1 and 2 in vertical alinement with each other, comprising the elements of any well known form of percussive welder, are connected to a welding circuit 3 having a generator 4 and a condenser 5 in series therewith. Pairs of gripping members, 6—6, 7—7 and 8—8, holding wires or other bodies 9, 10 and 11, respectively, are placed in such relation to the electrodes 1 and 2 that the junction of the bodies 9, 10 and 11 to be welded is between them and rests upon the working surface of the electrode 1.

The upper electrode 2 is vertically movable relative to the electrode 1 which is stationary. The movable electrode may be actuated in any suitable manner, as by gravity or spring means which are well known in the art in connection with percussive welding machines.

The gripping members 8—8 are connected to a source of electrical energy 12, usually a storage battery or generator of small capacity in a circuit 13 to provide electrical-resistance heating means for the body to be preheated, the circuit being provided with a switch 14.

To join a plurality of bodies by welding in accordance with this invention, I secure the bodies 9 and 10 between the pairs of gripping members 6—6 and 7—7, respectively. The body 11, which may be of greater cross section or conductivity, or more refractory, than the others, I clamp between the gripping members 8—8. I then connect the members 8—8 to the source of energy 12 by closing the switch 14 to cause a current to pass through the body 11 for heating it to the desired temperature. The electrode 2 is then brought into percussive engagement with the body to be welded, simultaneously closing the welding circuit 3 and causing a relatively large momentary discharge of current between the electrodes 1 and 2 and through the junction of the bodies 9, 10 and 11, thus welding the junctions together to form a unitary structure.

It will be seen from the above description of my invention that my method of preheating bodies to be welded, particularly those of relatively small cross section, is a distinct improvement over the methods described in the prior art in that it permits of very definite control of the heating current so that the heating will not be excessive. It is particularly adapted to welding wires, such as thermocouples, filaments and the like. It further provides a means for producing a strong uniform weld which is not brittle and which is simple to produce.

Although I have described a specific embodiment of my invention, it will be obvious to those skilled in the art that various modifications may be made in the details of construction of my apparatus without departing from the principles herein set forth. For instance, I may provide any number of gripping members placed in proper relation to each other, any one or more of which may be connected to a source of electrical energy for preheating the bodies to be welded and I may provide any suitable source of welding current other than that provided by a condenser discharge.

I claim as my invention:—

1. In a welding system, a plurality of gripping members, means for energizing certain of said gripping members, a pair of electrodes and means for simultaneously energizing said electrodes and effecting percussive engagement thereof with the parts to be welded.

2. In a welding system, a plurality of gripping members, some of which are connected to a source of heating current, means for energizing certain of said gripping members, a pair of electrodes and means for simultaneously energizing said electrodes and effecting percussive engagement thereof with the parts to be welded.

3. In a welding system, a plurality of gripping members, some of which are connected to a source of heating current, means for energizing certain of said gripping members, a pair of electrodes connected to a source of welding current and means for simultaneously energizing said electrodes and effecting percussive engagement thereof with the parts to be welded.

4. In a welding system, a plurality of gripping members, some of which are connected to an electrical-resistance heating circuit, means for energizing certain of said gripping members, a pair of electrodes connected to a source of welding current and means for simultaneously energizing said electrodes and effecting a percussive engagement thereof with the parts to be welded.

5. In a welding system, a plurality of gripping members, some of which are connected to an electrical-resistance heating circuit, means for energizing certain of said gripping members, a pair of non-fusible electrodes connected to a source of welding current having an electrical condenser connected in series therewith and means for simultaneously energizing said electrodes and effecting a percussive engagement thereof with the parts to be welded.

6. In a welding system, a pair of electrodes, means for superposing a plurality of bodies to be welded on one of said electrodes, means for heating certain of said bodies by passing a current therethrough, means for bringing the other of said pair of electrodes into engagement with said superposed bodies and means for passing a relatively large welding current between said electrodes through said superposed bodies perpendicular to the axes thereof to form a weld.

7. A method of welding which comprises providing a pair of infusible electrodes connected to a source of welding current, securing a plurality of metallic bodies between said electrodes in angular relation to each other, passing a relatively low heating current through certain of said bodies parallel to the axes thereof, bringing one of said pair of electrodes into percussive engagement with said bodies and simultaneously applying a relatively large electric current to said electrodes to weld the bodies into a unitary structure.

In testimony whereof, I have hereunto subscribed my name this 31st day of May 1921.

JAMES L. WEATHERWAX.